(12) United States Patent
Ohshima et al.

(10) Patent No.: US 10,668,641 B2
(45) Date of Patent: Jun. 2, 2020

(54) MAGNET CUTTING DEVICE

(71) Applicant: NISSAN MOTOR CO., LTD., Yokohama-shi, Kanagawa (JP)

(72) Inventors: Takumi Ohshima, Yokohama (JP); Kiyoshi Hasegawa, Yokohama (JP); Kimio Nishimura, Yokohama (JP); Takashi Sekikawa, Yokohama (JP); Yasushi Matsushita, Yokohama (JP); Akihisa Hori, Yokohama (JP); Michito Kishi, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 607 days.

(21) Appl. No.: 14/896,979

(22) PCT Filed: Apr. 25, 2014

(86) PCT No.: PCT/JP2014/061754
§ 371 (c)(1),
(2) Date: Dec. 9, 2015

(87) PCT Pub. No.: WO2014/199734
PCT Pub. Date: Dec. 18, 2014

(65) Prior Publication Data
US 2016/0136835 A1      May 19, 2016

(30) Foreign Application Priority Data
Jun. 13, 2013   (JP) .................................. 2013-124806

(51) Int. Cl.
*B26F 3/00*      (2006.01)
*B28D 1/28*      (2006.01)
(Continued)

(52) U.S. Cl.
CPC .................. *B26F 3/00* (2013.01); *B26F 3/02* (2013.01); *B28D 1/28* (2013.01); *H01F 41/0253* (2013.01);
(Continued)

(58) Field of Classification Search
CPC ............. Y10T 225/379; Y10T 225/386; Y10T 225/12; Y10T 225/321; Y10T 225/325;
(Continued)

(56) References Cited

U.S. PATENT DOCUMENTS 1,874,786 A * 8/1932 Mitchell .............. B23D 31/008
                                                    225/105
3,207,398 A * 9/1965 Persson .................. C03B 33/12
                                                    225/105

(Continued)

FOREIGN PATENT DOCUMENTS

JP    2009142081 A    6/2009
WO    2014007038 A1    1/2014

*Primary Examiner* — Evan H MacFarlane
(74) *Attorney, Agent, or Firm* — Young Basile Hanlon & MacFarlane, P.C.

(57)  ABSTRACT

The magnet cutting device includes a pair of supporting portions spaced apart by a predetermined distance and configured to support the magnet from a bottom side, a blade configured to press the magnet supported by the pair of supporting portions from an upper side of the magnet, and a magnet supporting tool arranged between the pair of supporting portions to support the magnet from the bottom side of the magnet. A surface of the magnet supporting tool to be held in contact with the magnet is shaped such that a central part of an upper end is higher than the upper ends of the pair of supporting portions and an end part of the upper end is lower than the upper ends of the pair of supporting (Continued)

portions when the magnet is placed on the surface, the upper end having a slope connecting the central part and the end part.

8 Claims, 11 Drawing Sheets

(51) Int. Cl.
  *H01F 41/02* (2006.01)
  *B26F 3/02* (2006.01)
(52) U.S. Cl.
  CPC .............. *H01F 41/0286* (2013.01); *H04Q 2213/13003* (2013.01)
(58) Field of Classification Search
  CPC .... B26F 3/002; B26F 3/00; B26F 3/02; H01F 41/02; H01F 41/0253; H01F 41/0296; H01F 41/0286; B28D 1/28; B28D 1/222; B28D 1/225; B23D 31/002; B23D 33/08; H02K 1/27; H02K 1/276; H02K 15/03; C03B 33/02; C03B 33/023; C03B 33/03
  See application file for complete search history.

(56) References Cited

U.S. PATENT DOCUMENTS

| | | | | |
|---|---|---|---|---|
| 4,730,763 | A * | 3/1988 | Smith | B26F 3/002 225/101 |
| 4,948,025 | A * | 8/1990 | Lisec | C03B 33/033 225/104 |
| 5,165,585 | A * | 11/1992 | Lisec | C03B 33/033 225/105 |
| 6,513,694 | B1 * | 2/2003 | Xu | B28D 5/0011 125/23.01 |
| 9,796,150 | B2 * | 10/2017 | Koike | B28D 1/222 |
| 2006/0261117 | A1 * | 11/2006 | Konrad | B28D 5/0011 225/2 |
| 2007/0158381 | A1 * | 7/2007 | Lisec | C03B 33/033 225/2 |
| 2008/0110952 | A1 * | 5/2008 | Kemmerer | B26F 3/002 225/2 |
| 2010/0244608 | A1 | 9/2010 | Nakamura et al. | |
| 2015/0158197 | A1 | 6/2015 | Takaichi et al. | |

* cited by examiner

MAGNET CUTTING DEVICE

CROSS REFERENCE TO RELATED APPLICATION

The present application claims priority to Japanese Patent Application No. 2013-124806 filed on Jun. 13, 2013 all of which is incorporated herein by reference.

TECHNICAL FIELD

This invention relates to a device for cutting a magnet.

BACKGROUND

Conventionally, there is known a technology using a long plate-like magnet formed by dividing a long magnet into a plurality of magnet pieces and integrating the plurality of divided magnet pieces as a magnet to be inserted into a magnet insertion hole of a rotor core of a motor to reduce an eddy current possibly generated in the magnet (see JP2009-142081A). In a method described in JP2009-142081A, the long magnet provided with cuts is placed on a lower punch and cut at the position of the cut by pressing an upper punch downwardly from above the long magnet.

Here, in the cutting method of JP2009-142081A, it is considered to provide a pair of supporting portions instead of the lower punch, set the long magnet so that the cutout is located between the pair of supporting portions and the magnet is cut by three-point bending by the pair of supporting portions and the upper punch. To improve the accuracy of a cut surface, an interval between the pair of supporting portions is better to be wide. However, if the interval is too wide, there is a possibility that the magnet piece falls down between the pair of supporting portions after cutting. Further, in setting the magnet at the next cutting position by pushing it in a lateral direction such as when burrs are present on the magnet after cutting, there is a possibility that the magnet after cutting is caught by the pair of supporting portions.

The present invention aims to prevent a magnet piece after cutting from falling down between a pair of supporting portions and prevent a magnet from being caught by the pair of supporting portions at the time of feeding the magnet.

The magnet cutting device in embodiment of the present invention includes a pair of supporting portions spaced apart by a predetermined distance, the pair of supporting portions being configured to support the magnet from bottom side of the magnet, a pressing portion configured to press the magnet supported by the pair of supporting portions from a upper side of the magnet, and a magnet supporting tool arranged between the pair of supporting portions to support the magnet from the bottom side of the magnet, the magnet supporting tool being configured to be vertically movable. A surface of the magnet supporting tool to be held in contact with the magnet is shaped such that a central part of an upper end of the magnet supporting tool is higher than the upper ends of the pair of supporting portions and an end part of the upper end of the magnet supporting tool is lower than the upper ends of the pair of supporting portions in a state where the magnet is placed on the surface, the upper end of the magnet supporting tool having a slope connecting the central part and the end part.

Embodiments and advantages of the present invention will be described in detail below with reference to the attached figures.

DESCRIPTION OF EMBODIMENTS

First Embodiment

Figure 1:
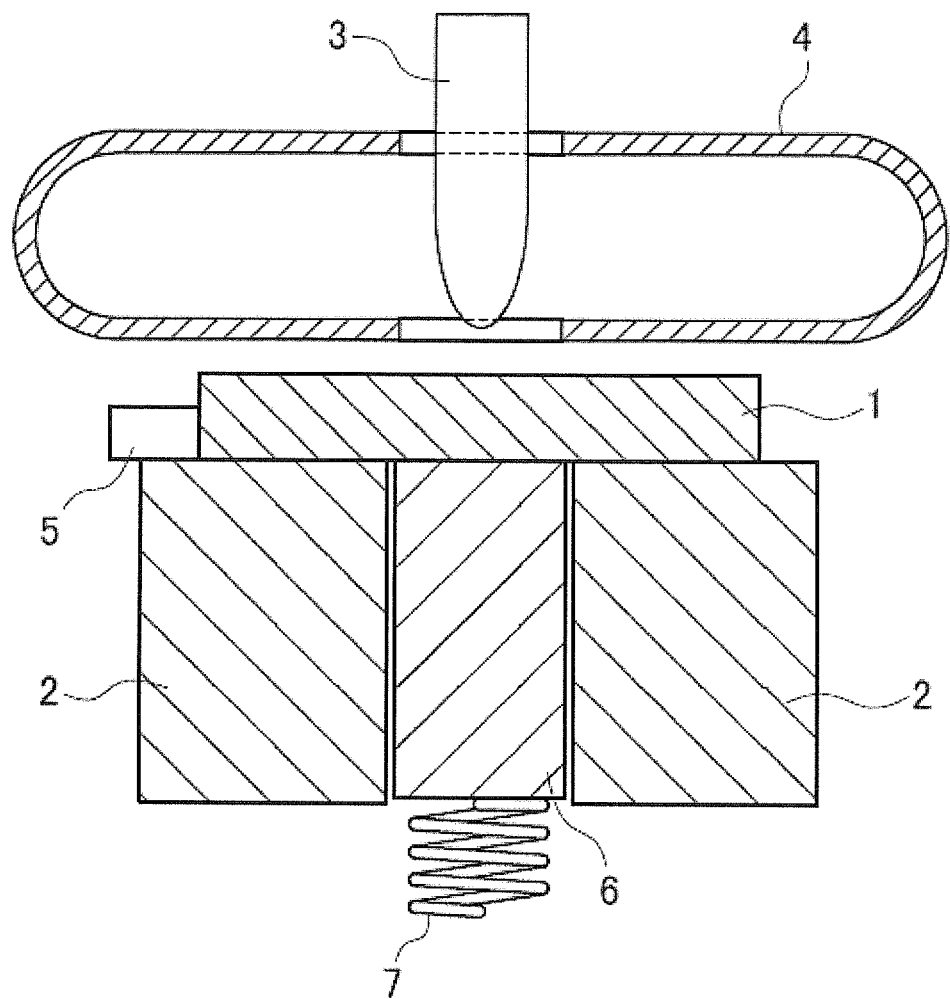
FIG. 1 is a diagram showing the overall configuration of a magnet cutting device in a first embodiment.

FIG. 1 is a diagram showing the overall configuration of a magnet cutting device in a first embodiment. The magnet cutting device in one embodiment includes a pair of supporting portions 2, a blade 3, a magnet pressing portion 4, a positioning tool 5, a magnet piece supporting tool 6 and a spring 7.

The pair of supporting portions 2 are spaced apart by a predetermined distance, the pair of supporting portions 2 being configured to support a magnet 1 from bottom side of the magnet. As shown in FIG. 1, the magnet piece supporting tool 6 is arranged between the pair of supporting portions 2 and supports the magnet 1 from below. The magnet piece supporting tool 6 is vertically movable by an elastic force of the spring 7.

Figure 2:
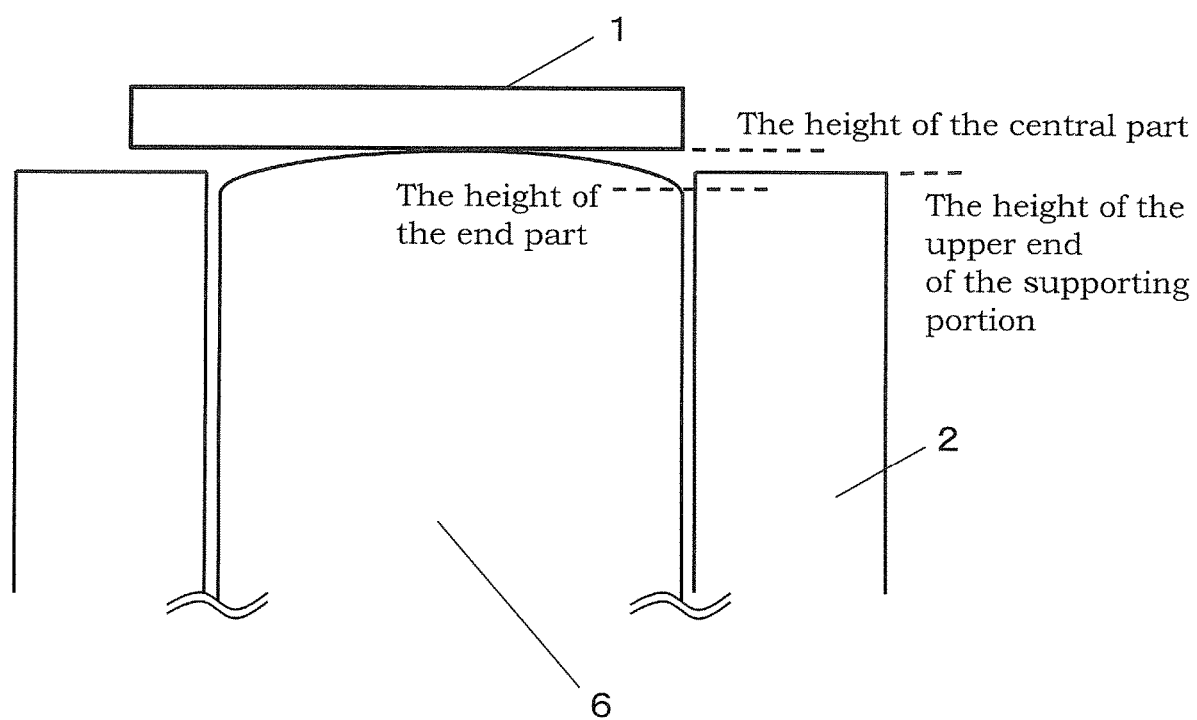
FIG. 2 is a diagram enlargedly showing an upper end part of a magnet piece supporting tool.

FIG. 2 is a diagram enlargedly showing an upper end part of the magnet piece supporting tool 6. As shown in FIG. 2, the magnet piece supporting tool 6 is shaped to be highest in an upper end central part thereof, become lower from the central part toward end parts and include slants connecting the upper end central part and the end parts. Further, in a state where the magnet 1 is placed on the magnet piece supporting tool 6, the upper end central part of the magnet piece supporting tool 6 is arranged to be higher than the upper ends of the pair of supporting portions 2 and both end parts of the upper end of the magnet piece supporting tool 6 are arranged to be lower than the upper ends of the pair of supporting portions 2. Specifically, the shape of the magnet piece supporting tool 6, a spring constant of the spring 7 and the like are so determined that the upper end central part of the magnet piece supporting tool 6 is at a position higher than the pair of supporting portions 2 and the both end parts of the upper end of the magnet piece supporting tool 6 are at positions lower than the pair of supporting portions 2 in the state where the magnet 1 is placed on the magnet piece supporting tool 6.

The magnet pressing portion 4 functions to press the magnet 1 from above. The blade 3 cuts the magnet 1 by pressing the magnet 1 fixed by being vertically sandwiched by the magnet pressing portion 4 and the magnet piece supporting tool 6 downwardly from above.

A magnet cutting method using the magnet cutting device in the first embodiment is described below.

Figure 3:
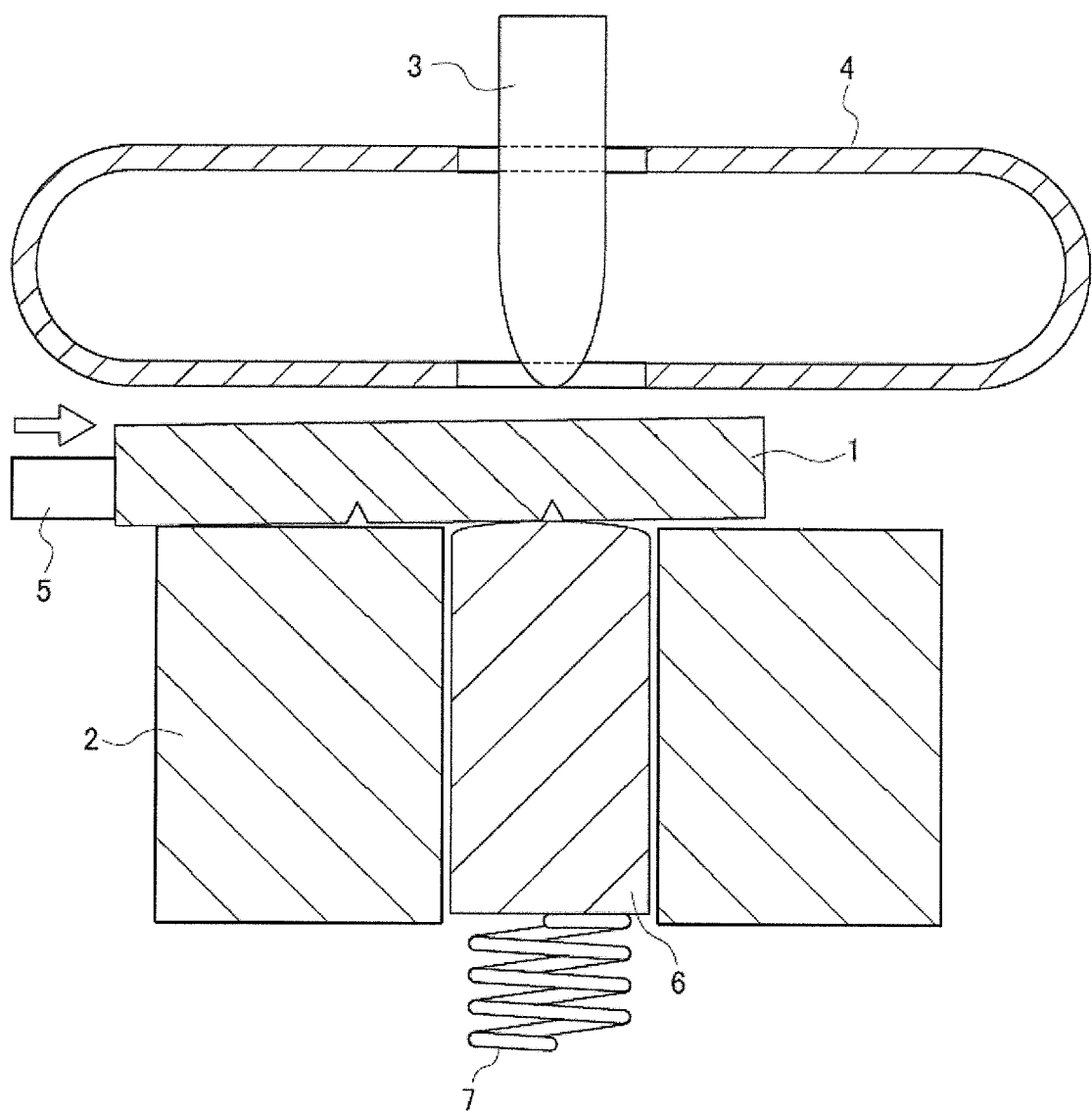
FIG. 3 is a diagram showing a method for positioning a magnet for cutting.

Grooves are provided at positions planned to be cut in advance on the magnet 1. The magnet 1 is so placed on the supporting portions 2 that the grooves are located on a lower side, and positioned by the known positioning tool 5 (see FIG. 3). More specifically, by pushing the magnet 1 in a rightward direction of FIG. 3 by the positioning tool 5, the groove of the magnet 1 is positioned to be located immediately below a lateral center of the blade 3. The positioning tool 5 is controlled, for example, using a positioning mechanism such as an LM guide.

Figure 4:
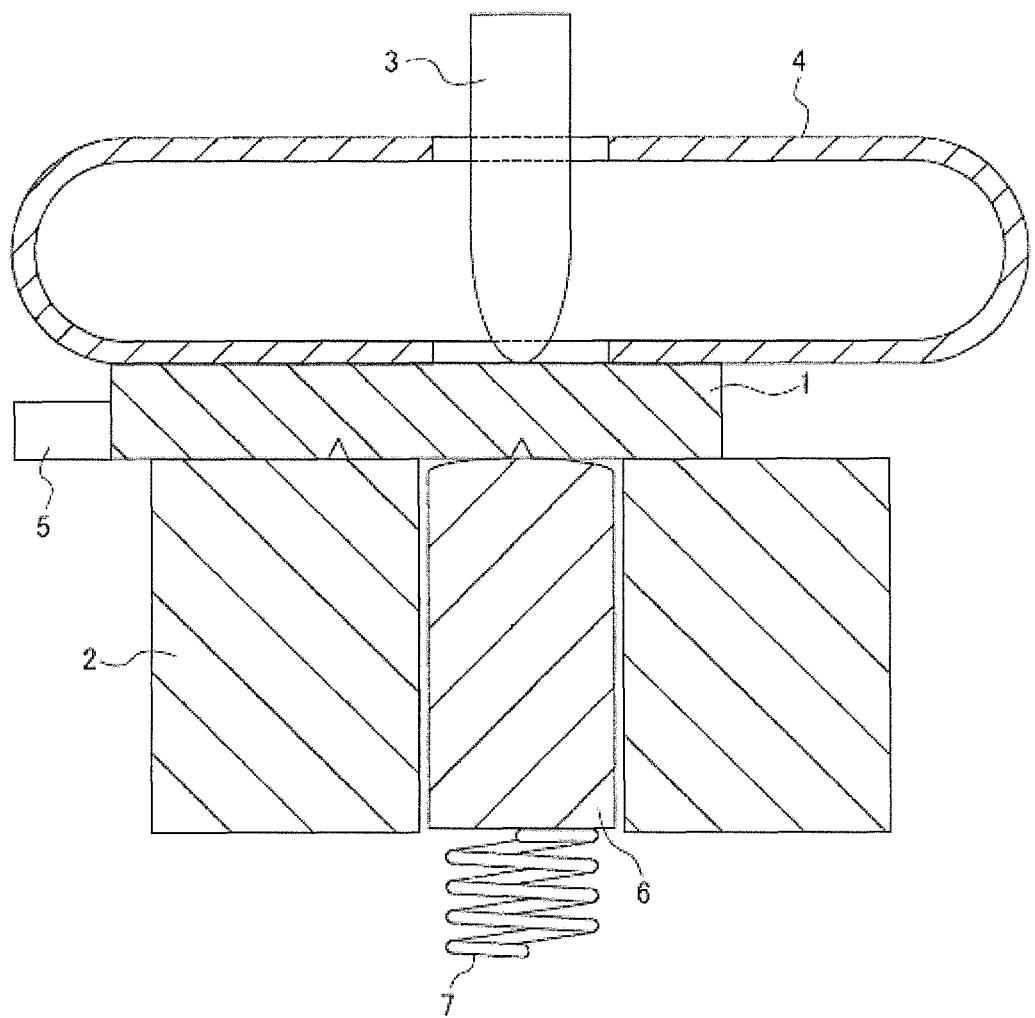
FIG. 4 is a diagram showing a state where the magnet is pressed from above by a magnet pressing portion.

Subsequently, the magnet pressing portion 4 and the blade 3 are moved downwardly to press the magnet 1 from above by the magnet pressing portion 4 (see FIG. 4).

Figure 5:
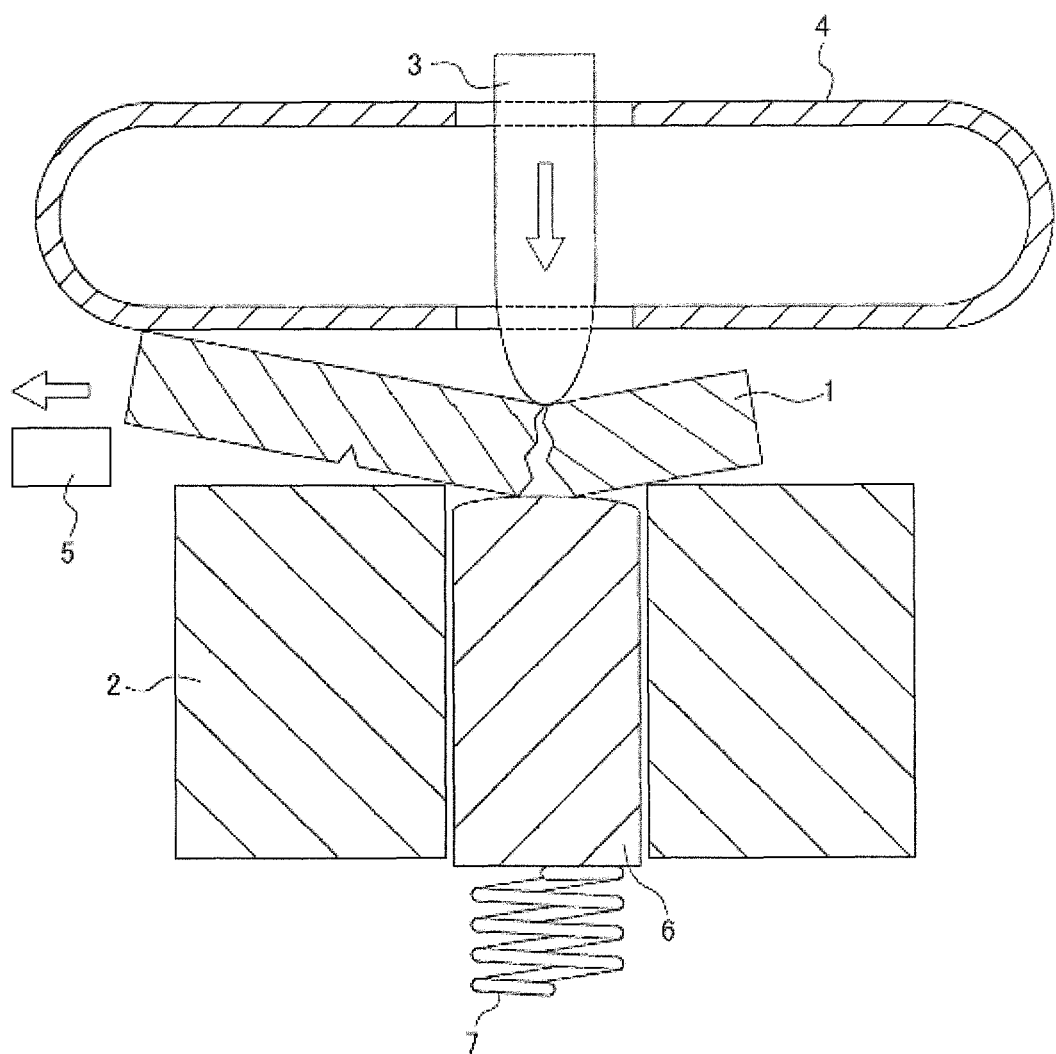
FIG. 5 is a diagram showing a state where the magnet is cut by pressing a blade downwardly.

Subsequently, the blade 3 is pressed downwardly and the magnet 1 is cut by three-point bending by the pair of supporting portions 2 and the blade 3 (see FIG. 5). Note that the positioning tool 5 is retracted to a position away from the magnet 1 before the cutting of the magnet 1 so as not to obstruct a movement of the magnet 1 after cutting.

Since the spring 7 is compressed via the magnet piece supporting tool 6 held in contact with the magnet 1 by a force for pressing the blade 3 downwardly, the magnet piece supporting tool 6 is pressed downwardly. The spring constant of the spring 7 for vertically moving the magnet piece supporting tool 6 by an elastic force is set at a suitable value so as not to affect cutting by three-point bending.

Figure 6:
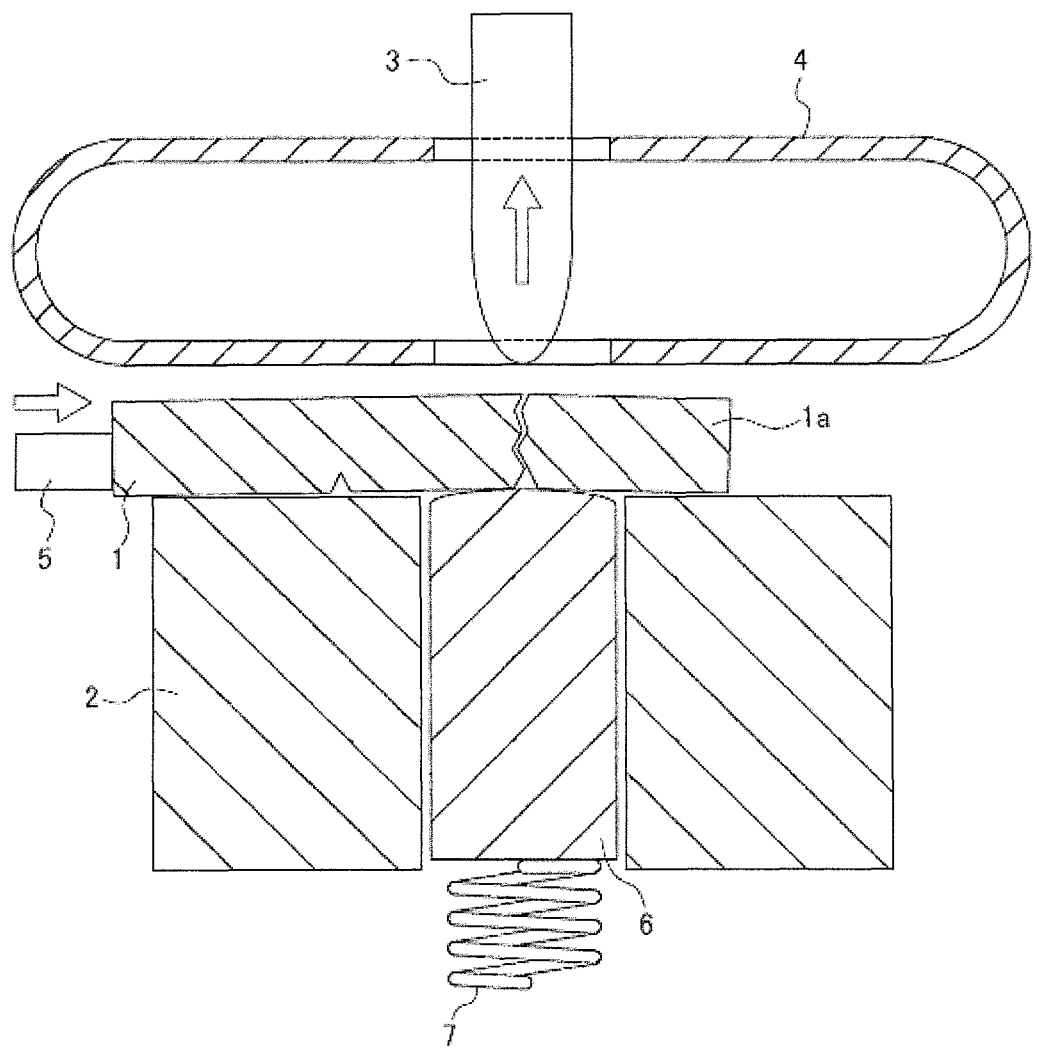
FIG. 6 is a diagram showing a state where the blade and the magnet pressing portion are elevated after the cutting of the magnet.

When the magnet 1 is cut, the blade 3 and the magnet pressing portion 4 are elevated and the positioning tool 5 is returned to the position before retraction (see FIG. 6).

Figure 7:
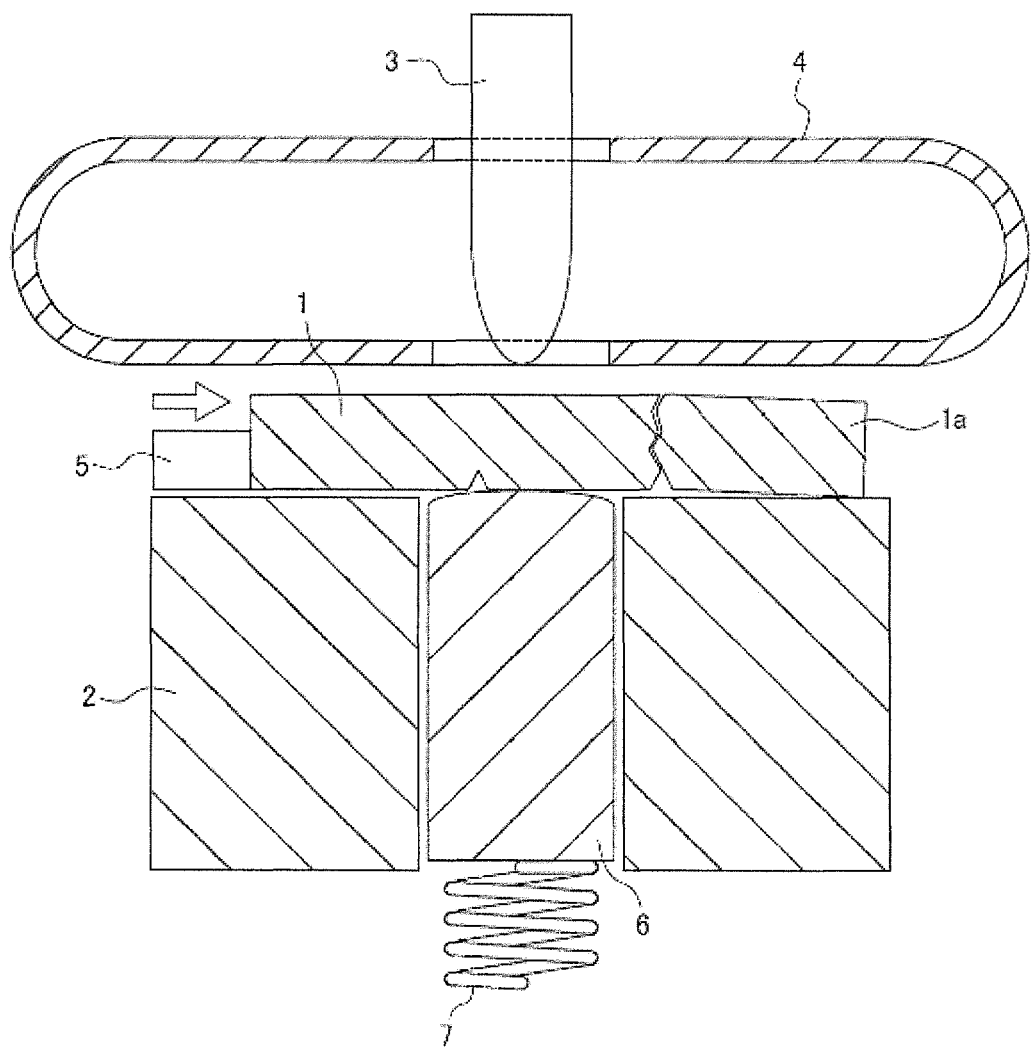
FIG. 7 is a diagram showing a method for positioning such that the next groove of the magnet is located immediately below a lateral center of the blade.
Figure 8:
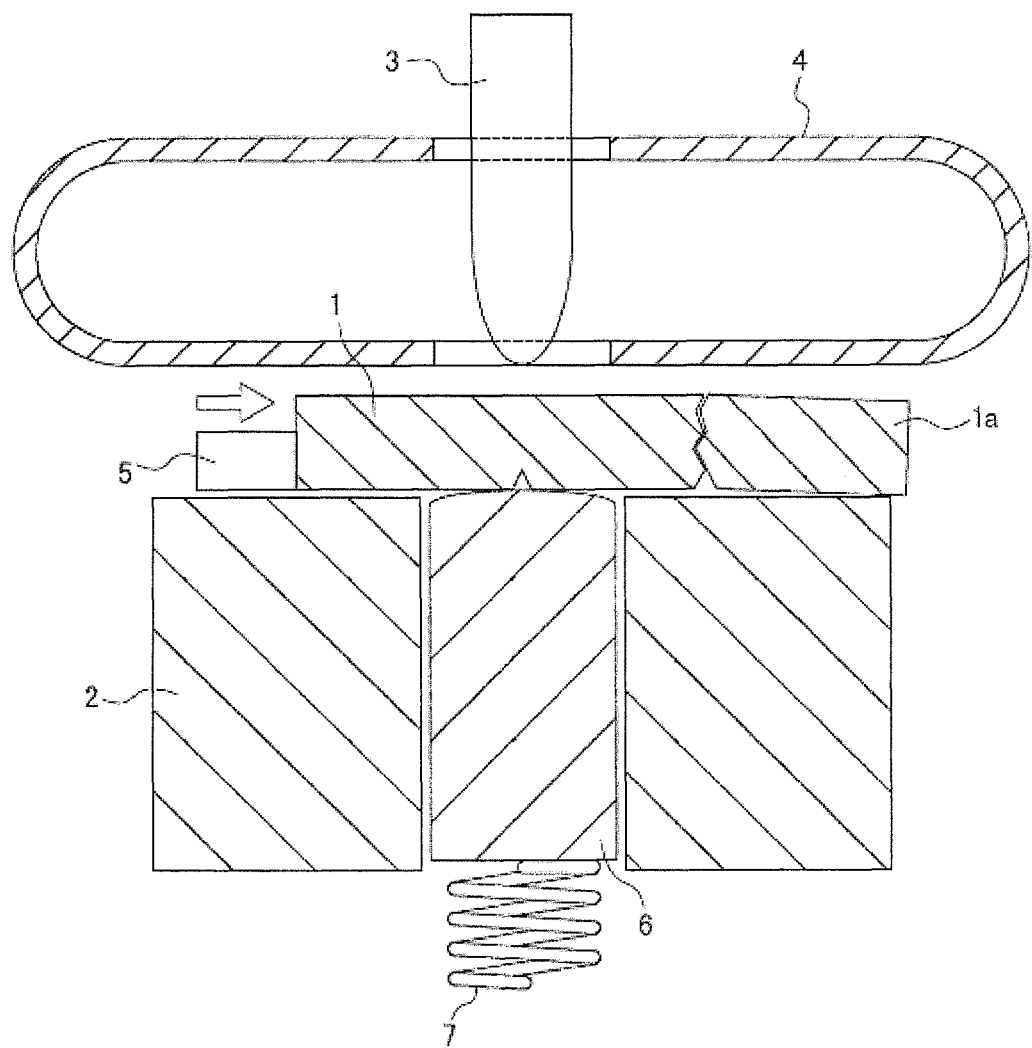
FIG. 8 is a diagram showing the method for positioning such that the next groove of the magnet is located immediately below the lateral center of the blade.

Thereafter, by pushing the magnet 1 in a rightward direction of FIG. 7 by the positioning tool 5, the next groove of the magnet 1 is positioned to be located immediately below the lateral center of the blade 3. This causes a cut magnet piece 1*a* to be also pushed and carried onto the supporting portion 2 located on the right side of FIG. 7 (see FIGS. 7 and 8). It should be noted that the spring constant and an expansion and contraction amount of the spring 7 are so selected that the magnet piece supporting tool 6 does not sink during the next positioning after the cutting of the magnet 1.

Figure 9:
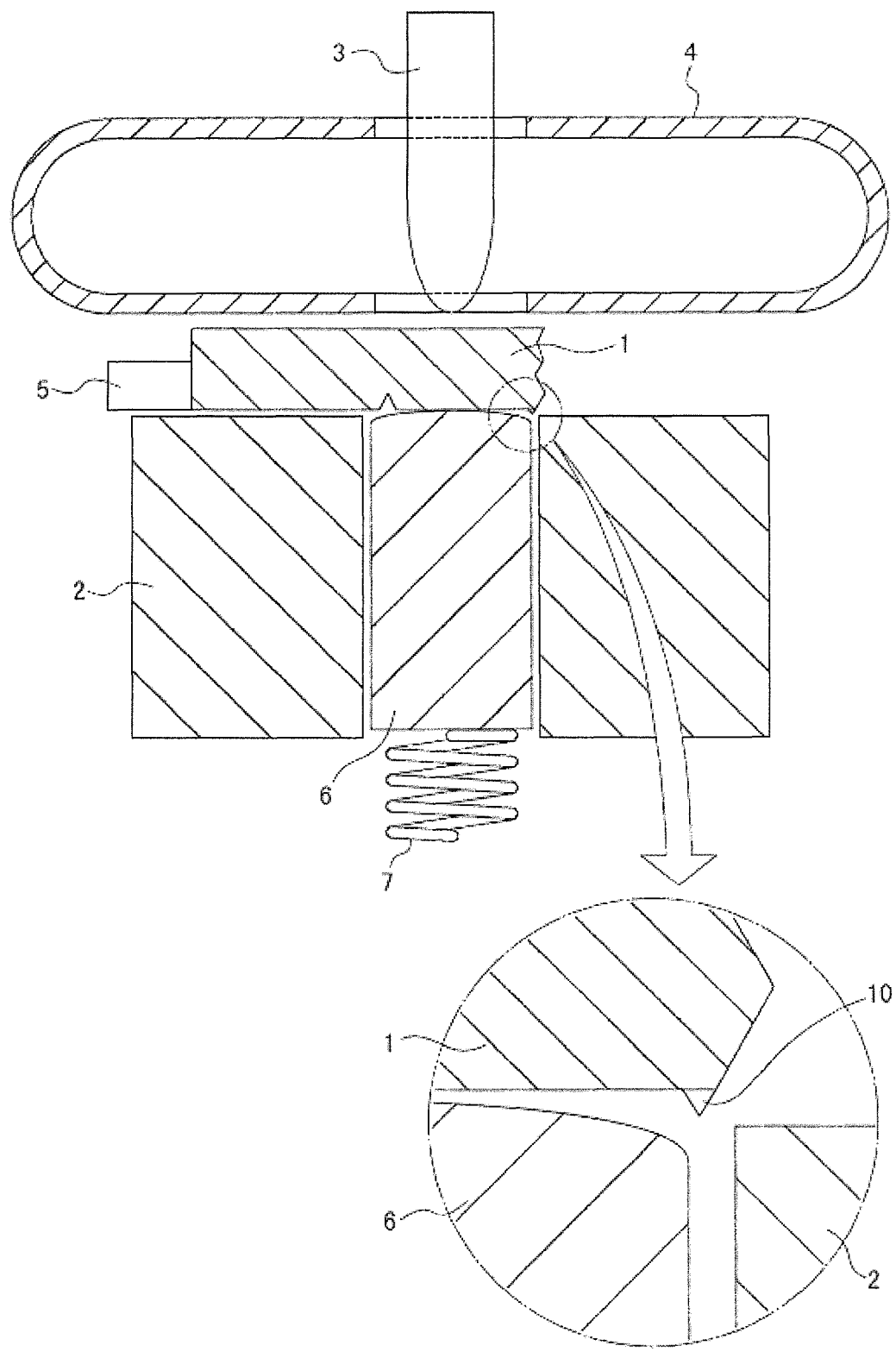
FIG. 9 is a diagram showing an effect of the magnet cutting device in the first embodiment.

When the magnet 1 is cut, burrs (projections) may be generated on and near a cut surface. In the magnet cutting device in the first embodiment, as described above, the upper end central part of the magnet piece supporting tool 6 is arranged at the position higher than the pair of supporting portions 2 and the both end parts of the upper end of the magnet piece supporting tool 6 are arranged at the positions lower than the upper ends of the pair of supporting portions 2 in the state where the magnet 1 is placed. Thus, even if burrs are present on the magnet 1 during the next positioning after magnet cutting, the magnet pushed by the positioning tool 5 is not caught by the supporting portions 2. Specifically, since the upper end central part of the magnet piece supporting tool 6 is at the position higher than the pair of supporting portions 2, a front end part of the magnet 1 pushed by the positioning tool 5 in a moving direction is at a position higher than the supporting portions 2 and a burr 10 of the magnet 1 is not caught by the supporting portion 2 as shown in FIG. 9.

As described above, the magnet cutting device in the first embodiment includes the pair of supporting portions 2 spaced apart by the predetermined distance, the pair of supporting portions 2 being configured to support the magnet from bottom side of the magnet, the magnet pressing portion 4 configured to press the magnet supported by the pair of supporting portions 2 from upper side of the magnet and the magnet piece supporting tool 6 vertically movable and arranged between the pair of supporting portions 2 to support the magnet from the bottom side of the magnet. Since the magnet piece supporting tool 6 is arranged between the pair of supporting portions 2, the magnet piece after cutting can be prevented from falling down between the pair of supporting portions. Further, since the magnet piece supporting tool 6 is so arranged that the upper end central part thereof is higher than the upper ends of the pair of supporting portions 2 and the end parts of the upper end thereof are lower than the upper ends of the pair of supporting portions 2 in the state where the magnet is placed and includes the slants connecting the central part and the end parts, the magnet can be prevented from being caught by the pair of supporting portions 2 when the magnet after cutting is fed.

It should be noted that if the magnet 1 is lifted and fed during the next positioning after magnet cutting, the magnet 1 is not caught by the supporting portions 2 even if burrs are present on the magnet 1. However, if a configuration for lifting and feeding the magnet 1 is adopted, equipment cost increases and positioning takes time. However, according to the magnet cutting device in this embodiment, such problems do not occur.

Second Embodiment

Figure 10:
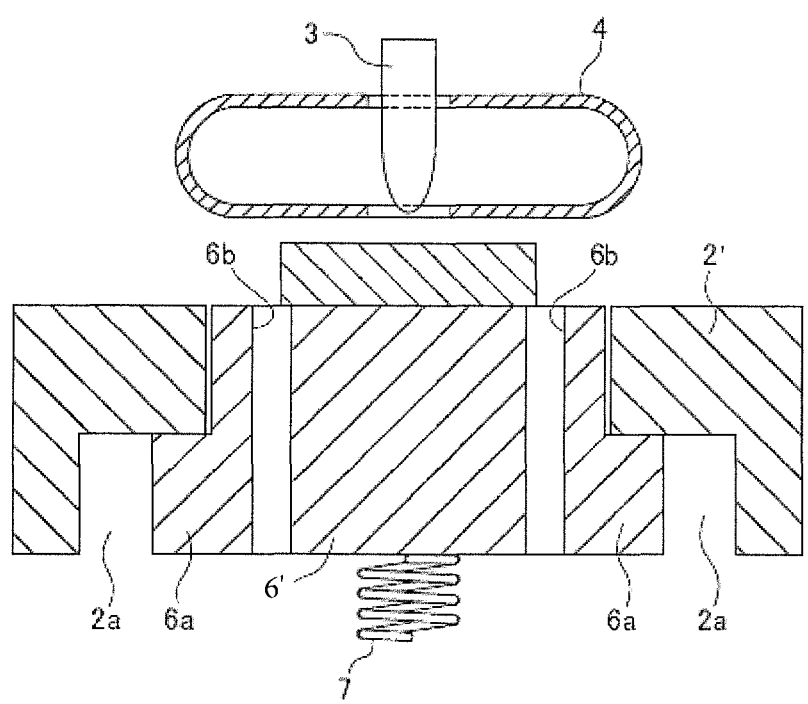
FIG. 10 is a diagram showing the overall configuration of a magnet cutting device in a second embodiment.

FIG. 10 is a diagram showing the overall configuration of a magnet cutting device in a second embodiment. The magnet cutting device in the second embodiment differs from that in the first embodiment in the structure of a pair of supporting portions 2' and the configuration of a magnet piece supporting tool 6'.

The magnet piece supporting tool 6' includes protruding portions 6*a*, the protruding portions 6*a* being formed so that a part of an outer and part of the magnet supporting tool 6' protrude toward the corresponding supporting portion 2' in a state where the magnet supporting tool 6' is arranged between the pair of supporting portions 2'. These protruding portions 6*a* protrude outwardly from positions spaced downwardly a predetermined distance from the upper end of the magnet piece supporting tool 6'. Further, the pair of supporting portions 2' are provided with space portions 2*a* into which the protruding portions 6*a* of the magnet piece supporting tool 6' are held or housed.

In a state where the upper ends of the protruding portions 6*a* of the magnet piece supporting tool 6' are in contact with the upper ends of the space portions 2*a* of the supporting portions 2'(state shown in FIG. 10), a central part of the upper end of the magnet piece supporting tool 6' is higher than the upper ends of the pair of supporting portions 2' and end parts of the upper end thereof are lower than the upper ends of the pair of supporting portions 2'. This enables the upper end of the magnet piece supporting tool 6' to be more accurately positioned when the magnet piece supporting tool 6' moved downwardly at the time of cutting the magnet 1 is elevated after the cutting of the magnet.

Further, at least parts of the upper end of the magnet piece supporting tool 6' are open and air blows out from these opening ends 6*b*. Since this enables contaminants (crushed powder) to be blown off even if the contaminants are present around the opening ends 6b, a change in the height of the upper end of the magnet piece supporting tool 6' due to the presence of the contaminants can be prevented.

Further, the opening ends 6b may have a suction function. By providing the opening ends 6b with the suction function, contaminants (crushed powder) can be sucked even if the contaminants are present around the opening ends 6b. Thus, a change in the height of the upper end of the magnet piece supporting tool 6' due to the presence of the contaminants can be prevented.

As described above, according to the magnet cutting device in the second embodiment, the magnet piece supporting tool 6' includes the protruding portions 6a protruding toward the pair of supporting portions 2' from the outer end parts of the magnet piece supporting tool 6' in the state where the magnet piece supporting tool 6' arranged between the pair of supporting portions 2', and the pair of supporting portions 2' are provided with the space portions 2a into which the protruding portions 6a of the magnet piece supporting tool 6' are held or housed The central part of the upper end of the magnet piece supporting tool 6' is higher than the upper ends of the pair of supporting portions 2' and the end parts of the upper end thereof are lower than the upper ends of the pair of supporting portions 2' in the state where the upper ends of the protruding portions 6a of the magnet piece supporting tool 6' are respectively in contact with the upper ends of the space portions 2a of the pair of supporting portions 2'. This enables the upper end of the magnet piece supporting tool 6' to be more accurately positioned when the magnet piece supporting tool 6' moved downwardly at the time of cutting the magnet 1 is elevated after the cutting of the magnet. Specifically, the magnet piece supporting tool 6' is elevated after the cutting of the magnet. Since a position where the upper ends of the protruding portions 6a of the magnet piece supporting tool 6' are in contact with the pair of supporting portions 2' is an initial position, the initial position can be accurately determined. Further, since the central part of the upper end of the magnet piece supporting tool 6' is higher than the upper ends of the pair of supporting portions 2' and the end parts of the upper end thereof are lower than the upper ends of the pair of supporting portions 2' at the initial position, the magnet can be prevented from being caught by the pair of supporting portions 2' during the feeding of the magnet after cutting as in the magnet cutting device in the first embodiment.

Further, since the magnet piece supporting tool 6' includes the opening ends 6b open in at least parts of the upper end and air blows out from the opening ends 6b, contaminants can be blown off even if the contaminants are present around the open parts. This can prevent a change in the height of the upper end of the magnet piece supporting tool 6' due to the presence of the contaminants.

Further, if the opening ends 6b have the suction function, contaminants can be sucked even if the contaminants are present around the open parts. This can prevent a change in the height of the upper end of the magnet piece supporting tool 6' due to the presence of the contaminants.

The present invention is not limited to the aforementioned embodiments. For example, in the magnet cutting device in the first embodiment, the pair of supporting portions 2' and the magnet piece supporting tool 6' may have the same configurations as those in the second embodiment. Further, in the magnet cutting device in the first embodiment, opening end(s) may be provided in at least part(s) of the upper end of the magnet piece supporting tool 6' to provide a function of blowing out air from the opening end(s) or a suction function as in the magnet cutting device in the second embodiment.

Figure 11:
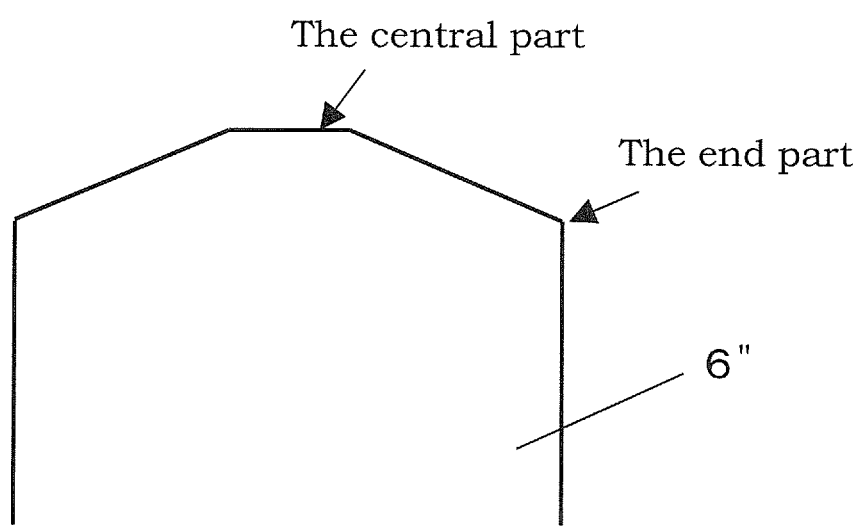
FIG. 11 is a diagram showing an example of another shape of the magnet piece supporting tool.

The magnet piece supporting tool 6' has only to be shaped to be highest in the upper end central part and become lower from the central part toward the end parts and include the slants connecting the upper end central parts and the end parts, and there is no limitation to the shape shown in FIG. 2. FIG. 11 is a diagram showing an example of another shape of the magnet piece supporting tool 6". The magnet piece supporting tool 6" may also be shaped as shown in FIG. 11.

The invention claimed is:

1. A cutting device for a magnet, the device comprising:
a pair of supporting portions spaced apart by a predetermined distance, the pair of the supporting portions being configured to support the magnet from a bottom side of the magnet;
a pressing portion configured to press the magnet from an upper side of the magnet;
a blade configured to press downwardly on the upper side of the magnet to cut the magnet by three-point bending by the pair of supporting portions and the blade; and
a magnet supporting tool arranged adjacently between the pair of the supporting portions, configured to vertically move, and having an upper surface including a central part configured to be in contact with the magnet from the bottom side and a peripheral end, the peripheral end configured not to be in contact with the magnet,
wherein:
the pair of the supporting portions respectively have top surfaces configured to support the magnet from the bottom side when the pressing portion presses the magnet,
the magnet supporting tool is further configured to cause, in a state where the pressing portion does not press the magnet, the central part to be located at a position higher than the top surfaces while causing the peripheral end to be located at a position lower than the top surfaces, and
the upper surface of the magnet supporting tool comprises a slope connecting the central part and the peripheral end.

2. The cutting device according to claim 1, wherein:
the magnet supporting tool includes a pair of protruding portions, each of the pair of the protruding portions having an upward contact face and formed by a part of an outer end part of the magnet supporting tool protruding toward a corresponding one of the pair of the supporting portions in a state where the magnet supporting tool is arranged between the pair of the supporting portions;
each of the pair of the supporting portions includes a space portion to accommodate a corresponding one of the pair of the protruding portions and includes a downward contact face which delimits an upper end of the space portion; and
the magnet supporting tool is further configured to cause the central part to be located at the position higher than the top surfaces in a state where the upward contact face of the each of the pair of the protruding portions is in contact with the downward contact face of a corresponding one of the pair of supporting portions.

3. The cutting device according to claim 1, wherein:
the magnet supporting tool includes an opening end at least at a part of the upper surface the magnet supporting tool configured to blow out air from the opening end.

4. The cutting device according to claim 1, wherein:
the magnet supporting tool includes an opening end at least at a part of the upper surface and is configured to suction air from the opening end.

5. The cutting device according to claim 1, wherein the magnet includes grooves located on a lower side of the magnet, the cutting device further comprising a positioning tool configured to align a one of the grooves of the magnet with the blade.

6. The cutting device according to claim 5, wherein the positioning tool is configured to:
position the magnet such that the one of the grooves is located below a lateral center of the blade;
retract to a position away from the magnet before the magnet is cut;
return to at position in contact with the magnet after the magnet is cut; and
reposition the magnet such that a next one of the grooves of the magnet is positioned to be located below the lateral center of the blade.

7. The cutting device according to claim 1, comprising a spring, wherein the magnet supporting tool is vertically movable by an elastic force of the spring.

8. The cutting device according to claim 7,
wherein the spring is compressed via the magnet supporting tool held in contact with the magnet when the blade presses the upper side of the magnet downwardly.

* * * * *